United States Patent
Veley

[11] 3,741,308
[45] June 26, 1973

[54] METHOD OF CONSOLIDATING SAND FORMATIONS

[75] Inventor: Carl Veley, Dallas, Tex.

[73] Assignee: Permeator Corporation, Dallas, Tex.

[22] Filed: Nov. 5, 1971

[21] Appl. No.: 195,915

[52] U.S. Cl.................. 166/292, 166/288, 61/36 R
[51] Int. Cl....................... E21b 33/138, E02d 3/14
[58] Field of Search................... 166/292, 293, 294, 166/288; 61/36 R

[56] References Cited
UNITED STATES PATENTS

| | | | |
|---|---|---|---|
| 2,156,220 | 4/1939 | Dunn | 166/292 |
| 2,224,120 | 12/1940 | Hart | 166/293 |
| 2,875,835 | 3/1959 | Watkins et al. | 166/293 |
| 2,880,096 | 3/1959 | Hurley | 166/293 |
| 2,955,653 | 10/1960 | Cain | 166/292 X |
| 3,243,962 | 4/1966 | Ratliff | 61/36 R |
| 3,526,172 | 9/1970 | Stuart | 166/292 X |

Primary Examiner—Stephen J. Novosad
Attorney—David Toren and Bernard X. McGlady

[57] ABSTRACT

Loose sand is consolidated by passing an aqueous solution of calcium hydroxide through the sand. The solution is prepared and passed in such a fashion that the sand being consolidated reacts with at least about 4.0 grams $Ca(OH)_2$ per liter of pore volume in the sand body. Following this period, an additional time of up to 350 hours may be required, during which the solution remains in contact with the sand but does not necessarily flow.

12 Claims, 1 Drawing Figure

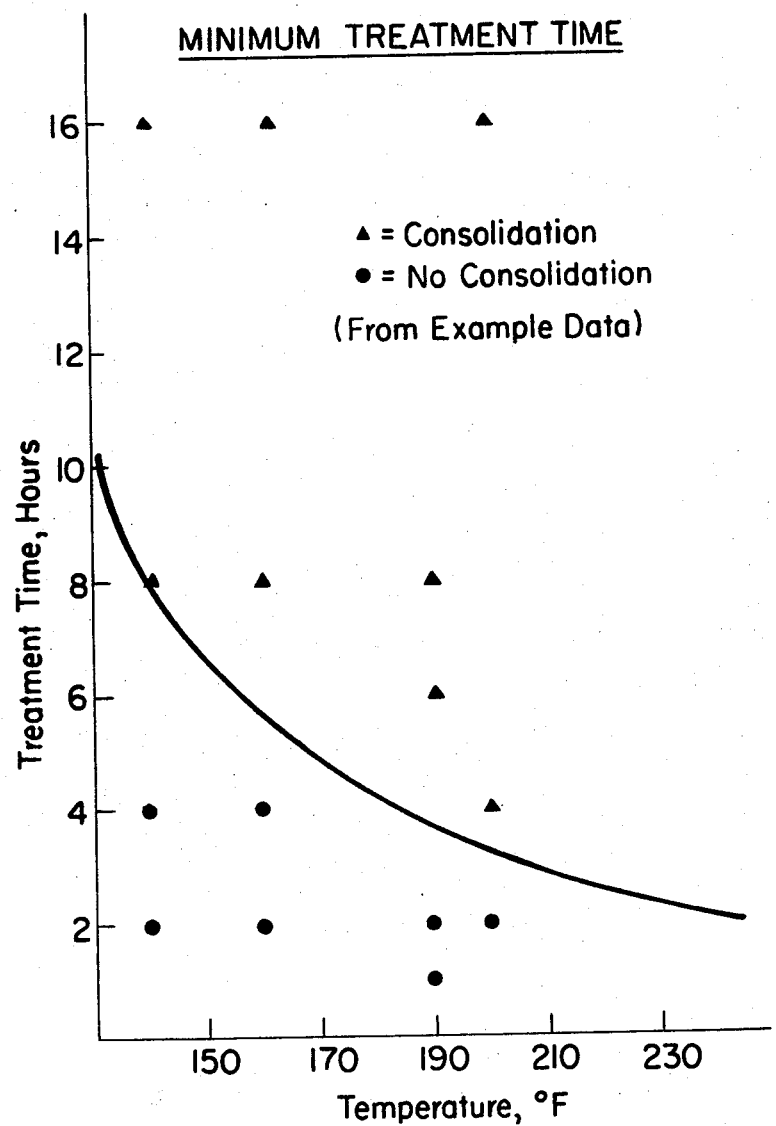

METHOD OF CONSOLIDATING SAND FORMATIONS

FIELD OF INVENTION

The invention relates to the consolidation of unconsolidated sand formations into consolidated formations which are permeable to fluids, such as gas, oil and water.

The term "sand" as used herein is deemed to refer to any assemblage of particulate matter provided:
1. particles in the 50 – 2000 micron (0.05 – 2 millimeter) size range account for at least about 10 percent of the weight of the entire assemblage,
2. at least about 20 percent by weight of the entire assemblage consist of minerals or compounds containing the element silicon as part of their chemical composition, and
3. the assemblage is either unconsolidated or so poorly consolidated that it behaves as an unconsolidated particulate system under stresses to which it is exposed.

The term "sand formation" as used herein shall mean any body of such sand, but will frequently be used in reference to natural sand deposits such as subsurface strata.

Although the invention is useful for the consolidation of sand formations in general, it is particularly applicable to — and thus will primarily be described in connection with — the consolidation of subsurface sand formations encountered in the production of oil, gas and water from subsurface earth formations.

BACKGROUND INFORMATION AND PRIOR ART

Much of the world's petroleum, gas and water deposits are found in buried earth formations that are poorly consolidated. These formations generally are relatively young in the sense of geological time and are simply composed of loose sand or sediments that have not yet been converted to solid sandstone by geochemical processes.

Wells drilled into such loose or poorly consolidated formations often suffer severe operational problems. Fluids flowing from the formation into the wellbore tend to carry loose sand or formation particles with them, and the formation surrounding the wellbore area thus progressively collapses and flows into the well. Sand, carried up the well by produced fluids, tends to erode pipes, damages pumps, fills surface tanks and lines, interferes with fluid processing, and damages valves or flow measuring devices. In addition, sand often collects in the piping to such an extent that fluid production is halted or substantially reduced. Sometimes large volumes of sand are removed from a fluid-producing formation leaving a cavern or cavity around the wellbore. Shale or rock from above this formation may then fall into the cavity and interfere with further fluid production.

Sand production in oil and gas wells also has an important relationship to pollution and safety hazards. It is common to install safety valves in oil and gas wells at some depth below the surface. These valves are especially common (required by law) in offshore wells, and automatically block flow from the well if storms, fires or other disasters should damage surface equipment controlling the well. The purpose of these valves is prevention of uncontrolled flow which causes spills and feeds fires.

It is common for safety valves to malfunction in wells that produce sand. The sand often erodes these valves or collects in them to such an extent they will not operate properly. Furthermore, many such valves change fluid flow patterns in such a way that sand tends to collect above them. In many wells it is necessary to remove the sand on top of the valve frequently in order to maintain fluid production.

Major oil spills and fires have resulted from malfunctioning of safety valves, and others have been attributed to the absence of such valves. Reluctance to install these valves is often a direct result of produced sand clogging them rapidly, and expensive sand removal procedures becoming prohibitively frequent.

It is therefore extremely desirable to prevent production of sand from oil or gas-bearing formations, and a variety of systems are commonly employed for this purpose. Common sand control systems can be divided into two broad categories: 1.) filter mechanisms, and 2.) consolidation processes.

Filtering systems are often constructed in wells through a process known as gravel packing. In a common variety of the gravel packing process, a screen or perforated liner is attached to a string of pipe and lowered into position in the sand-producing formation. Fluid is then pumped down the outside of this pipe string and passes through the screen back up the inside of the pipe string. Sand or gravel is added to the fluid and deposits in the space between the screen and the walls of the wellbore. It is commonly considered undesirable for any of this carrier fluid to flow into the formation and steps are taken to minimize forcing the carrier fluid out of the wellbore into the sand formation.

Sand used in gravel packing commonly has a controlled or selected particle size distribution. In general it is desirable for the sand to be too large to pass through the screen and small enough to prevent formation sand particles from passing through the gravel pack.

Gravel packs and other filtering systems are very common methods used for sand control in oil, gas and water wells. However, they frequently are ineffective or unsatisfactory.

Formation particles are often so small that they readily pass through the gravel pack and screen into the well. If the particle size of the sand used in forming the gravel pack is reduced or screen opening sizes reduced enough to retain these extremely fine grained formation particles, then fluid flow may also be significantly restricted or halted.

The most desirable method of sand control in wells involves consolidation of the sand. Commonly, liquid plastics are pumped into the loose sand surrounding a wellbore and then caused to harden. When appropriate procedures are followed, this plastic will form coatings around sand grains and bond them together without completely filling the pore spaces or open volume between the sand grains. This produces a strong, consolidated body of permeable sand around the wellbore which does not collapse into the well and also blocks flow of formation particles from beyond the consolidated zone into the wellbore. Many different sand consolidation procedures have been tried, but the ones most commonly used involve phenolformaldehyde, furan, epoxy or other plastic systems.

Sand consolidation with plastic has some advantages but also some rather severe limitations. When properly applied, plastic consolidations produce excellent sand control in wells. However, they involve costly and relatively difficult and cumbersome procedures pumping small volumes of chemicals. The resins are often flammable, toxic or hazardous to handle, and there is some danger of the hardening process occurring before the plastic has been properly placed in the loose sand. In deep wells where natural formation temperatures may exceed 200° F there is particular danger of plastics hardening while still in the pipe en route to the formation.

Even if correctly placed, many of the common plastics used have limited resistance to brines and oils flowing through the consolidated mass at temperatures greater than about 200° F. Therefore, when a well, whose reservoir temperature exceeds about 200° F, is returned to production following a plastic consolidation treatment, the plastic may deteriorate within a few weeks or months causing the sand to again become unconsolidated.

Characteristically, plastic sand consolidation treatments have little chance of success in wells whose sand-producing intervals are vertically thicker than about 10 – 15 feet. Chances of obtaining uniform distribution of the plastic diminish rapidly in thicker zones. Successful application of sand-consolidation plastics is also difficult or impossible in formations with high concentrations of clay minerals or shales.

There is therefore a need for improved methods of sand consolidation, particularly in oil or gas wells that have thick sand producing intervals, high natural reservoir temperatures or high clay mineral contents. A major need for improved sand consolidation procedures also occurs in wells that are stimulated with hot water or steam where temperatures may exceed 400°F.

Most loose sand formations contain at least some clay minerals in the form of small deposits between the sand grains. Fluids, especially water, flowing through the sand formation can disperse these clay mineral deposits. Such dispersion of clay minerals causes two problems in operation of wells penetrating these formations.

First, and apparently consolidated formation may suddenly become unconsolidated if water disperses clay deposits. The weak cementing action of clay may hold sand grains together while oil or gas flows through the sand, but when water disperses or softens that clay, the sand loses strength or becomes unconsolidated. For this reason and others, sand production from oil or gas wells often begins or accelerates when they start producing water.

The second problem associated with clay dispersion is permeability reduction. When small clay particles disperse or are dislodged by flowing fluids they tend to lodge in flow channel restrictions and form filter cakes that can severely restrict flow. This reduction in permeability obviously inhibits production of fluids from the well, but it can also greatly increase sand production by changing stresses around a wellbore.

When permeability decreases around a wellbore, the pressure drop associated with fluid production occurs over a smaller radius. For example, if reservoir pressure is 2,000 psi and wellbore pressure is 1,000 psi, then a pressure drop of 1,000 psi is associated with the fluid production. When permeability is high this pressure drop occurs over a large radius around the wellbore. If permeability decreases, this pressure drop occurs over a smaller radius and total flow rate declines.

The stress on formation sand surrounding a wellbore is higher if a 1,000 psi pressure drop occurs over a distance of 5 feet than if that same pressure drop occurs over a distance of 15 feet. Consequently, weakly consolidated sand may remain consolidated during early fluid production, but suddenly fail and collapse into the wellbore if clay dispersion causes permeability reduction and increases stress on the sand.

There is therefore a need for treatment procedures which would prevent dispersion of clays in addition to consolidating sand formations.

It has been proposed to structurally stabilize hydratable shaley materials by a modified gravel packing procedure, wherein the carrier fluid for the gravel is a highly alkaline aqueous solution containing calcium hydroxide. Such a procedure is disclosed in U.S. Pat. No. 2,955,653. According to this prior art patent, the calcium hydroxide reacts with the shaley material to change its properties. It has, however, been found that the exact application procedure disclosed in that patent does not result in the desired effect. The patent states in column 2, lines 11 – 18:

"It has been discovered that hydratable shaley materials, such as so-called heaving shales, *upon contact with an alkaline aqueous solution* having the characteristics above described are not only prevented from swelling and disintegrating but also undergo hardening and are transformed after a period of time, about 24 – 168 hours depending upon the temperature, higher temperatures accelerating the hardening process, into a cement-like or rock-like material." (Emphasis supplied)

According to this statement and the entire teachings of that patent, one should expect a body of shale or "shaley material" to be transformed or hardened by mere contact with a saturated aqueous solution of Ca(OH)$_2$, followed by a 24 – 168 hour waiting time. This is true only in a very limited sense and only if certain steps not taught by the patentee are taken.

The routine process of gravel packing a well requires relatively short total pumping times, generally less than about 2 hours. During this time, gravel-carrying fluid is in most instances pumped past the sand formation for less than about 0.5 – 1.0 hour, and the carrier fluid usually is circulated back to the surface and not intentionally forced out into the formation.

Consequently, in a normal gravel packing process using Ca(OH)$_2$ solution as described in U.S. Pat. No. 2,955,653: 1.) the gravel-carrying fluid passes any given segment of sand formation (wellbore wall) for less than about 0.5 – 1.0 hour, 2.) very little if any of that fluid flows out of the wellbore into the sand formation, and 3.) fluid remaining in the wellbore when pumping stops will be separated from the formation sand by the sand or gravel just deposited. The quantity of Ca(OH)$_2$ which can react with the formation in these circumstances is so limited that no significant hardening of either sand formations or shales will in fact occur. At best only a very thin layer or "skin" of consolidated material will develop immediately on the wellbore wall.

From information in U.S. Pat. No. 2,955,653, it can be reasonably concluded that the patentee conducted laboratory tests wherein small chunks or pieces of shale were immersed in a container of saturated Ca(OH)$_2$ solution, the container then being sealed and stored at elevated temperature for a few days. In such circumstances considerably more than one pore volume of solution is available for reaction with the small shale sample, and the outer surface of the shale sample might indeed harden. In fact, diffusion processes may transport enough $Ca(OH)_2$ into the shale sample to produce some hardening beneath the sample's surface. But if that sample is compacted by pressures such as would be caused by weight of sediments overlying a buried formation, diffusion of $Ca(OH)_2$ cannot be expected to produce consolidation in an ordinary shale to a depth of more than a few millimeters beyond the surface exposed to the $Ca(OH)_2$ solution.

It has now been shown in laboratory experiments that hardening of shale as described in the cited patent will occur only if that shale is reacted with substantially more $Ca(OH)_2$ than can be contained in a volume of saturated solution equal to the pore volume of the shale. In practice, it is necessary to force relatively large volumes of solution through a shale to cause appreciable hardening. The patentee did not anticipate this fact and consequently has described an application procedure which is ineffective.

SUMMARY OF INVENTION

It is a primary object of the invention to provide a procedure for converting unconsolidated sand formations into permeable, consolidated formations in a manner which overcomes drawbacks and disadvantages of the prior art procedures and which results in consolidated formations of superior characteristics which retain their consolidated state for long periods of time.

It is also an object of the invention to provide a procedure of the indicated kind wherein the consolidation can be readily controlled to extend to a desired distance from the wellbore so as to create optimum operating conditions for the production of fluids, such as oil, gas or water.

Another object of the invention is to provide a procedure of the indicated kind which is relatively simple to carry out, does not require a high degree of skill, is safe and inexpensive and can be performed with a minimum of equipment.

Yet another object of the invention is to provide a sand consolidation procedure which will at the same time consolidate or chemically alter clay mineral deposits present in sand formations in such a fashion that these clays cannot thereafter disperse in flowing fluids.

A further object of the invention is to provide a sand consolidation procedure which will function in high temperature systems, such as oilwells being treated with high pressure steam.

Generally, it is an object of the invention to improve on the art of consolidating sand formations.

Briefly, and in accordance with this invention, the above objects are superiorly attained by passing an aqueous solution of calcium hydroxide through the pores of an unconsolidated sand formation. Composition of the solution, volume of the solution and injection rates are determined by the prevailing conditions, and solution injection may be either intermittent or continuous, with continuous flow being generally preferred. In a continuous flow procedure, the calcium hydroxide solution must pass through the sand for at least a certain minimum time, according to the reaction temperature, as shown in the attached graph. Intermittent or stepwise procedures generally require smaller solution volumes but much longer total treatment times than continuous flow procedures. The solution can be prepared by dissolving calcium hydroxide in fresh water, brines or steam. Following the solution injection period, a static period up to 350 hours may be employed to improve the consolidation, but when solution injection time is at least tenfold greater than the indicated minimum, this static period may in some cases be reduced or eliminated.

From a practical viewpoint, the invention is advantageously carried out by continuously passing calcium hydroxide through the sand formation for a period of 4 – 24 hours and then maintaining contact between solution and formation for 2 – 14 additional days.

Barium hydroxide or strontium hydroxide can be substituted for calcium hydroxide in the practice of this invention, but the final cementing material formed from the reactions is less resistant to flowing fluids, and consequently these compounds produce consolidation inferior to that attained with calcium hydroxide. Availability and cost factors also make calcium hydroxide generally preferable over barium and strontium hydroxides. It is noted, however, that both barium and strontium hydroxide are more soluble in water than calcium hydroxide and this property could make them preferable to calcium hydroxide in some special applications where solution volume is vitally important and a less durable consolidation is acceptable.

If either barium or strontium hydroxide is substituted for calcium hydroxide in the practice of this invention, the minimum amounts required to cause consolidation can be calculated from relative ratios of the formula weights of $Ca(OH)_2$, $Sr(OH)_2$ and $Ba(OH)_2$. Thus, if a given sand must react with at least about 4.0 grams $Ca(OH)_2$ per liter of pore space, then it must react with at least about 9.25 grams $Ba(OH)_2$ or at least about 6.57 grams $Sr(OH)_2$ per liter of pore space to produce comparable minimum consolidation. Flow rates and total volumes can be adjusted in accordance with the different chemical formula weights and solubility values.

The consolidation process occurs more rapidly at elevated temperatures. A temperature range of about 130°F – 500°F has been found suitable.

In practice it is usually desirable to consolidate sand around a wellbore to a distance of about 6 inches to 10 feet. A combination of solution treatment time and static reaction time can be employed to achieve the desired extent of consolidation, but laboratory experiments with the particular sand involved may be necessary to optimize the procedures.

Volumes of solution used may also vary with concentration of calcium hydroxide, but in any event, each segment of sand to be consolidated must react with at least about 4.0 grams calcium hydroxide per liter of pore space in that sand segment if a completely loose sand is to be effectively consolidated. Calcium hydroxide is more soluble in some brines than it is in plain water. Therefore when such a brine is used as the solvent for the $Ca(OH)_2$, some adjustments in solution volume or flow rate may be possible, but minimum treatment times as indicated in the attached graph must still be observed.

Sand formations effectively consolidated in this inventive procedure may contain very large amounts of shaley material or such material may be entirely absent.

It is obviously possible to produce a solution of calcium hydroxide in many different ways in the practice of this invention. For example, adding sodium hydroxide to a solution of calcium chloride could be used to produce a calcium hydroxide solution, or calcium carbide could be added to water with the resulting reaction producing acetylene and calcium hydroxide. As another example, calcium salts of weak acids hydrolyze to form calcium hydroxide, and such salts could be used as an alternate method of producing an effective solution. It might in fact be desirable to employ such indirect procedures at times. An oil or hydrocarbon fluid might be used to transport or deposit solid calcium oxide or calcium carbide at the bottom of a well or on a sand formation surface, and water subsequently flowing past or through this deposit would become in fact a solution of calcium hydroxide. These and many other indirect procedures would be obvious to anyone skilled in the art and do not depart from the scope or spirit of his invention.

The invention will now be described by way of examples, it being understood that these examples are given only for purposes of illustration and not in any way as limitation on the invention procedures.

BRIEF DESCRIPTION OF THE DRAWING

The single FIGURE is a graph of consolidation values obtained in accordance with the invention as a function of treatment time and temperature.

DETAILED DESCRIPTION

It has been found that sand formations (which may or may not contain clays or minerals commonly described as "shaley material") can be effectively consolidated by treatment with aqueous solutions of calcium hydroxide, provided certain procedures are followed. The necessary procedures to follow and quantities of chemical required will become clear from the following discussion which is presented only to aid understanding the invention, and not as a limitation or restriction on the invention.

Solutions of calcium hydroxide react with silicate minerals to produce various complex, polymeric, hydrous calcium silicates of relatively uncertain compositions and chemical structure. These silicate reaction products have a low solubility in water and thus tend to remain right where they form—on the surface of the sand grains. Therefore, as chemical reactions proceed in the practice of this invention, the sand grains become coated with calcium silicates of unknown or indefinite composition. This coating cements individual sand grains together and increases structural strength of the sand assemblage. The increase in structural strength is dependent on the amount of cementing material formed, and the stability or strength of that cementing material. This invention deals with both of these factors.

Calcium hydroxide reacts with clay minerals commonly found in sand formations. After such reaction, clay deposits are much less dispersible in water. Also, if clay is widely scattered throughout the sand formation in the form of small deposits between larger sand grains, then prolonged reactions between the clay and calcium hydroxide may produce stable, complex silicates that aid the consolidation process.

The quantity of cementing material formed, by whatever reactions may occur, is obviously determined by the quantity of calcium hydroxide which reacts with the sand. If the pore spaces in a sand assemblage are filled with a saturated water solution of $Ca(OH)_2$, some cementing material will form as chemical reactions proceed. However, the reaction can only continue until the $Ca(OH)_2$ has been consumed, and the quantity of cementing material will be limited by the amount of $Ca(OH)_2$ contained in that one pore volume of solution.

(A "pore volume" of solution is that volume which will exactly fill all the voids or spaces between solid particles in any given body of sand under consideration.)

It has been found that one pore volume of water saturated with calcium hydroxide will not produce enough cementing material to effectively consolidate loose sand or sand formations as previously defined. This fact reflects the relatively low solubility of $Ca(OH)_2$ in water. Effective sand consolidation can only be achieved if the sand reacts with more $Ca(OH)_2$ than can be dissolved in one pore volume of water.

One solution to this problem would be as follows:
a. Fill the pore spaces in a sand body with a solution of $Ca(OH)_2$.
b. Leave that solution in place until all $Ca(OH)_2$ has been consumed by chemical reaction.
c. Replace the spent solution with fresh $Ca(OH)_2$ solution, making the replacement in as short a time as possible.
d. Repeat steps (b) and (c) until enough cementing material has been formed to satisfactorily increase the sand's strength.

It has been found that such a process will indeed work, but the solution must be replaced several times to effectively consolidate loose sands. That is, the sand must react with at least about 4.0 grams $Ca(OH)_2$ per liter of its pore space or as much $Ca(OH)_2$ as would be contained in about 3.5 pore volumes of a saturated water solution at 140° F to 5.0 pore volumes at 200° F, although the actual quantity depends on the particle sizes and mineral compositions of the particular sand — some sands may require more. These quantities of solution reflect the fact that solubility of $Ca(OH)_2$ in water decreases with increasing temperature. Different reaction temperatures or different chemical concentrations would of course require proportionally more or fewer pore volumes of solution to contain the same quantity of $Ca(OH)_2$.

In actual practice, such a procedure of intermittently replacing $Ca(OH)_2$ solutions would not generally be practical. Continuous injection of solution would usually be preferable, but a continuous flow situation changes the basis for computing volumes of $Ca(OH)_2$ solution required to produce the desired cementing material.

Suppose a pipe is filled with sand, and $Ca(OH)_2$ solution is flowed through that sand at 200° F. Further suppose that the total pore volume of this sand body in the pipe is 1.00 liter. As stated above, the sand must react with at least as much $Ca(OH)_2$ as would be contained in 5 pore volumes or 5.00 liters of saturated solution, if satisfactory consolidation is to be obtained. But, if the solution contains 0.8 grams $Ca(OH)_2$ per liter (approximate saturation concentration at 200° F) when it enters the sand, it will contain somewhat less than 0.8 grams $Ca(OH)_2$ per liter when it leaves the sand-filled pipe. At least part of the $Ca(OH)_2$ will be consumed by chemical reaction with the sand, and this fact is vital in determining how much $Ca(OH)_2$ will be required to consolidate this example quantity of sand with a flowing solution.

Continuing this example, suppose 5.00 liters of saturated $Ca(OH)_2$ solution is caused to flow very slowly through the sand. If the flow rate is slow enough, $Ca(OH)_2$ concentration may be reduced to essentially zero before the solution passes through the sand. That is, all $Ca(OH)_2$ in the 5.00 liters of solution may be consumed by chemical reaction near the inlet end of the sand-filled pipe while that sand near the outlet end of the pipe never reacts with any. Sand at the inlet end would then be very strongly consolidated while sand at the outlet end would not have reacted to form cementing material and would be loose. This fact has been demonstrated with simple laboratory experiments.

Now let us keep our same hypothetical sand-filled pipe (with pore volume = 1.00 liter) and pass saturated $Ca(OH)_2$ solution through it again at 200° F but at very high flow rates. We now find that $Ca(OH)_2$ concentration is only slightly lower in the solution leaving the sand than it was in the solution entering the sand. When we have passed 5.00 liters solution (5 pore volumes) through, the sand at both the inlet and outlet ends has reacted with $Ca(OH)_2$ to essentially the same extent, but much of the $Ca(OH)_2$ passed on through the sand without reacting, and the amount of cementing material formed at any point in the sand body will not be sufficient to produce effective consolidation. This fact is due to the relatively slow chemical reaction rates and has also been demonstrated with simple laboratory experiments.

Imagine a very thin "slice" of sand at the outlet end of this sand-filled pipe "cut" perpendicular to the axis of the pipe. If we wish to consolidate that slice of sand, we must react it with at least about 4.0 grams $Ca(OH)_2$ per liter of pore space or at least about as much $Ca(OH)_2$ as would be contained in a volume of saturated solution equal to five times the pore volume of that slice, at this example temperature of 200° F. However, in order to get that much $Ca(OH)_2$ to the outlet end of the sand body we must inject the solution at a rate high enough to insure that it will arrive at the outlet end before all $Ca(OH)_2$ has been consumed, and we must continue passing solution until the last milliliter of pore space has reacted with at least 0.004 grams $Ca(OH)_2$. This automatically means that a thin slice of sand near the inlet end will have reacted with more $Ca(OH)_2$ than would have been contained in a volume equal to five times its pore volume, and the total volume of solution passed through the sample will be more than five times the total pore volume of 1.00 liter.

In a practical sense then, if we flow the solution steadily and continuously, we must inject substantially more than 5.00 liters saturated $Ca(OH)_2$ solution into our hypothetical sand-filled pipe if we wish to consolidate all the sand therein, including that near the outlet end. At the same time, if we only wish to consolidate a thin slice of sand at the inlet end, 5.00 liters saturated solution flowed very slowly through the pipe should be more than adequate.

Obvious analogies can be drawn between this hypothetical example and the process of consolidating sand around a wellbore. Sand immediately around the wellbore would be represented by sand at the inlet end of the pipe and that sand at the outlet end would represent sand some distance from the wellbore. In such a situation, one must first determine or estimate how much cementing material must be produced or how much the sand's strength must be increased around the wellbore to withstand anticipated stresses.

In general, it is believed desirable or necessary to consolidate sand to a distance of about 6 inches to 10 feet as measured perpendicular to the axis of the wellbore. The treatment times, injection rates, volumes and chemical quantities necessary to achieve this extent of consolidation can be estimated or calculated with data from laboratory experiments.

Laboratory measurements of precise chemical reaction rates involve tedious and sometimes difficult procedures. If one of the chemical reactants is uncertain (an impure material or assemblage of different materials), the measurements are complicated and may change significantly with small variations in composition of the uncertain reactant. Therefore it is generally not practical to determine precise chemical reaction rates between $Ca(OH)_2$ solutions and specific sand formation samples. A simpler, more useful method is needed for determining amounts of $Ca(OH)_2$ required in specific sand consolidation applications. Such a method can be developed through the following reasoning.

Suppose calcium hydroxide solution is forced through the above hypothetical sand-filled pipe for exactly 10.0 hours. Further suppose that conditions of temperature, flow rate, $Ca(OH)_2$ concentration, and sand composition are such that at precisely that instant the necessary amount of reaction product has been formed at the outlet end of the sand to produce the desired consolidation effect.

Now, consider the situation when $Ca(OH)_2$ solution has passed through this example sand for less than 10.0 hours—say, 9.0 hours. At this time considerable reaction product has been formed throughout the sand sample and the inlet end may have reacted to the extent that it is already adequately consolidated. Also, the pore spaces in the sand are still filled with $Ca(OH)_2$ solution at the instant when flow stops. Concentration of $Ca(OH)_2$ in that trapped pore volume of solution will be somewhat less near the outlet end than at the inlet end, but, by definition of this example, concentration must be greater than zero at the outlet end or consolidation reactions would not be occurring.

Suppose when flow stops after 9.0 hours the last milliliter of pore space at the outlet end of this example is filled with solution that contains 0.00075 grams unreacted $Ca(OH)_2$ which would have passed on out of the sample if flow had continued. If sand grains surrounding that milliliter of pore space have reacted with as much as 0.00325 grams $Ca(OH)_2$ at the end of 9.0 hours, they can continue reacting with that 0.00075 grams $Ca(OH)_2$ trapped in that milliliter of pore space when flow stops and thereby form the necessary amount of reaction product. Since chemical reaction rates decrease with decreasing reactant concentration, several hours may be required for complete reaction of this last 0.00075 grams $Ca(OH)_2$, but total solution injection time could nonetheless be reduced from 10.0 hours to 9.0 hours. Alternate consolidation procedures in this example would then include either a continuous injection of $Ca(OH)_2$ solution for 10.0 hours or injection for only 9.0 hours followed by a shut-in or static period of several hours. Either procedure should produce an adequate quantity of cementing material (reaction products) under these assumed conditions, and satisfactory consolidation might also be achieved by even shorter injection times if different reaction parameters are assumed.

Maintaining static conditions at the end of the $Ca(OH)_2$ treatment period may be valuable for another reason. The complex silicates formed through reaction of $Ca(OH)_2$ with the sand components may be subject to changes in structure or composition with time. That is, those reaction products initially formed may change over a period of time into other, more stable compounds of molecular structures. This possibility is not definitely known, but laboratory tests have shown that sand consolidated by treatment with $Ca(OH)_2$ may be more resistant to flowing brines if a shut-in or static period is allowed at the end of the treatment. This could be due to formation of more cementing material, as previously discussed, or to a "curing" or change of the cementing material.

The following laboratory procedure has been found useful in predicting the amounts of solution required and proper injection rates for achieving the desired consolidation in sand formations surrounding wellbores.

a. Treat several samples of the sand in question, under appropriate temperature and pressure conditions, with $Ca(OH)_2$ solution flowed at such a rate that $Ca(OH)_2$ concentration is not greatly reduced when the solution passes through the sample. Treat each sample for a different length of time.

b. Seal the samples and store them at the test temperature for several days or until no significant further changes with time can be recorded. This static period obviously can also be varied.

c. Determine the optimum combination of injection time and static or cure time for the sample and reaction conditions involved.

Such procedures have been followed many times with many different sand samples. From those test programs, it has been found that most sands require a minimum chemical treatment time, which varies with temperature as shown on the attached graph.

When chemical treatment time does not exceed this indicated minimum by at least tenfold, a static period of up to 350 hours must be employed to complete the effective consolidation. During this static period no more solution is injected and fluid flow is kept to essentially zero. Longer static periods are required at lower temperatures while shorter static periods are acceptable at higher temperatures, when such static periods are needed.

In general, the consolidation reactions proceed at such slow rates at low temperatures that this procedure is not practical to apply in wellbores or sand formations where the temperature is below about 130° F. It may of course be possible to heat the sand formation to this temperature or above by injecting steam or hot water into the well or by simply heating the $Ca(OH)_2$ solution as it is injected into the sand formation.

In summary this invention differs from the prior art in the following ways:

1. The solution containing the calcium hydroxide is intentionally flowed through the poorly consolidated sand formation.

2. The solution is flowed through the sand formation in sufficient quantities to consolidate the formation to a distance of at least 6 inches from the wellbore.

3. Although this invention may be used in conjunction with a gravel packing procedure, it does not require a gravel packing operation for successful sand consolidation and may, in fact, be substituted for gravel packing procedures.

4. Although this invention effects sand consolidation in the presence of shaley materials, it does not require the presence of shaley materials for sand consolidation.

5. The quantities of calcium hydroxide and the treatment times taught in the prior art, are not sufficient to effect sand consolidation.

EXAMPLES

All tests were performed with 65 gram portions of the same sand sample from an oil well in southwest Louisiana. This sand contained about 2 – 5 percent shaley material. In each instance, the sand was placed in a specially constructed Hassler-Sleeve type device. Hydraulic pressure of 2,000 psi was applied for 15 minutes to the outside of the sleeve containing the sand. This pressure compacted the sand to approximately the condition expected in a natural earth formation. This hydraulic pressure was then reduced to 250 psi and maintained constant to confine the sand during the remainder of the test. The solution used in these tests was prepared by saturating 3 percent calcium chloride brine with hydrated lime, $Ca(OH)_2$, but similar results have been obtained using distilled water, 3 percent sodium chloride, 3 percent potassium chloride, and other salt concentrations in the $Ca(OH)_2$ carrier fluid. Results appear to be largely independent of the type or concentration of these salts added to the $Ca(OH)_2$ solution. In each test, solution flow rate was high enough that little or no difference could be detected in $Ca(OH)_2$ concentration at the outlet and inlet ends of the sand samples.

In the following table, "Treatment Time" refers to the time $Ca(OH)_2$ solution flowed through the sand sample, and "Total Time" indicates the time that the sample was in contact with the $Ca(OH)_2$ solution, including both the time the solution was flowing and the time it was sealed without access to fresh solution. "Hardness" indicates a value obtained by pressing the flat end of a cylindrical hardened steel point (0.01225 square inch cross-sectional area) against the sample with measured force. When the point had deflected the sample surface by 0.010 inch the force at that time divided by the point area, 0.01225 square inch, was recorded as "Hardness." This method is similar to the Brinell Hardness procedure.

| Treatment Time (hours) | Total Time (hours) | Total Volume $Ca(OH)_2$ Solution Thru Sample (liters) | Average* Hardness (psi) | Test Temperature (°F) |
|---|---|---|---|---|
| 2 | 168 | 2.00 | nil | 140 |
| 2 | 336 | 1.85 | nil | 140 |
| 4 | 168 | 1.87 | nil | 140 |
| 4 | 336 | 0.93 | nil | 140 |
| 8 | 168 | 2.05 | 109 | 140 |
| 16 | 168 | 5.50 | 370 | 140 |
| 47 | 216 | 1.40 | 326 | 140 |
| 2 | 168 | 1.20 | nil | 160 |
| 4 | 168 | 1.65 | nil | 160 |
| 8 | 168 | 1.53 | 150 | 160 |
| 8 | 336 | 1.42 | 172 | 160 |
| 16 | 360 | 2.10 | 465 | 160 |
| 24 | 168 | 2.05 | 974 | 160 |
| 24 | 360 | 2.17 | 562 | 160 |
| 48 | 168 | 2.80 | 1240 | 160 |
| 49.5 | 236 | 8.00 | 1095 | 160 |

| | | | | |
|---|---|---|---|---|
| 49.5 | 236 | 6.50 | 1300 | 160 |
| 2 | 72 | 2.00 | nil | 190 |
| 7.5 | 72 | 2.00 | 228 | 190 |
| 42 | 72 | 1.50 | 294 | 190 |
| 43 | 72 | 5.30 | 360 | 190 |
| 0.17 | 168 | 1.00 | nil | 190 |
| 0.78 | 168 | 1.00 | nil | 190 |
| 5.4 | 168 | 0.85 | 292 | 190 |
| 20 | 168 | 1.20 | 354 | 190 |
| 22.5 | 168 | 1.80 | 377 | 190 |
| 31.5 | 168 | 1.23 | 1254 | 190 |
| 49 | 168 | 1.21 | 1278 | 190 |
| 94 | 168 | 2.44 | 2760 | 190 |
| 2 | 168 | 2.00 | nil | 200 |
| 2 | 336 | 1.50 | nil | 200 |
| 4 | 168 | 2.00 | 1250 | 200 |
| 4 | 336 | 1.79 | 284 | 200 |
| 16 | 168 | 2.00 | 1120 | 200 |
| 16 | 72 | 1.97 | 1720 | 200 |
| 24 | 192 | 1.26 | 2500 | 200 |
| 48 | 316 | 2.17 | 3080 | 200 |

*Hardness was measured on both fluid inlet and outlet ends of each sample. The indicated value is an average of those two measurements.

It was found that the hydroxides of barium and strontium function much the same as calcium hydroxide when applied in a similar manner. That is, aqueous solutions of $Ba(OH)_2$ or $Sr(OH)_2$ will effectively consolidate sand when passed through the sand for extended periods of time, but calcium hydroxide is generally preferred over barium hydroxide and strontium hydroxide. The cementing material produced by reaction of $Ca(OH)_2$ and sand is more durable (more resistant to attack by hot brines and formation fluids) than the cementing materials produced by reaction of sand with $Sr(OH)_2$ or $Ba(OH)_2$. In addition, calcium hydroxide is more readily available and less expensive.

The above data and results of many other such experiments with different sand samples have been used in defining the treatment time minimums shown in the attached graph. Points from the above data table have been plotted on the graph for illustration purposes. Obviously it is not feasible to conduct laboratory tests with all sands. It is therefore entirely possible that some minor lowering of the curve shown might be found in specific unusual sands, particularly if some partial natural consolidation exists therein.

What is claimed is:

1. A method of converting an unconsolidated sand formation into a consolidated, permeable formation, said method comprising:
   a. flowing a volume of aqueous calcium hydroxide solution into and through the pores of said unconsolidated formation;
   b. adjusting volume and flow rate of said solution in such a fashion that each segment of the sand formation being consolidated reacts with at least about 4.0 grams calcium hydroxide per liter of pore space in that segment; and
   c. maintaining thereafter a portion of said solution in contact with sand of the formation for a period of time as required for effective consolidation to occur.

2. A method as in claim 1, wherein the solution is prepared by adding one or more chemicals to water or brine which will either hydrolyze or react with each other to produce calcium hydroxide.

3. A method as in claim 1, wherein said solution is substantially saturated with calcium hydroxide.

4. A method as in claim 1, wherein the flow of solution in step (a) is essentially continuous.

5. A method as in claim 1, wherein the solution in step (a) is prepared by adding calcium hydroxide to water.

6. A method as in claim 1, wherein the solution is prepared by adding calcium hydroxide to brine or aqueous solution containing at least one of the chlorides, bromides, iodides, acetates, formates, nitrates, nitrites, chlorites or chlorates of sodium, potassium, lithium, calcium, barium, strontium, or ammonium.

7. A method as in claim 1, wherein step (a) and/or step (c) is carried out at elevated temperatures.

8. A method as in claim 7, wherein said elevated temperature is in the range of 130° F to 500° F.

9. A method of converting an unconsolidated sand formation adjacent a wellbore into a consolidated, permeable formation, said method comprising:
   a. continuously passing a volume of aqueous calcium hydroxide solution through said wellbore and through the pores of the sand formation;
   b. adjusting volume and flow rate of said solution in such a fashion that any given segment of sand formation, removed from the wellbore at least about 6 inches but less than about 10 feet, reacts with at least 4.0 grams calcium hydroxide per liter of pore space in that segment; and
   c. maintaining thereafter the last portion of said solution in contact with the sand formation for a period of up to 350 hours as needed to produce satisfactory consolidation.

10. A method as in claim 9, wherein the solution is passed through said wellbore and through pores of the sand formation by pumping the solution under pressure.

11. A method of converting an unconsolidated sand formation into a consolidated, permeable formation, said method comprising:
    a. flowing a volume of aqueous barium hydroxide solution into and through the pores of said unconsolidated formation;
    b. adjusting volume and flow rate of said solution in such a fashion that each segment of the sand formation being consolidated reacts with at least about 9.25 grams barium hydroxide per liter of pore space in that segment; and
    c. maintaining thereafter a portion of said solution in contact with sand of the formation for a period of time as required for effective consolidation to occur.

12. A method of converting an unconsolidated sand formation into a consolidated, permeable formation, said method comprising:
    a. flowing a volume of aqueous strontium hydroxide solution into and through the pores of said unconsolidated formation;
    b. adjusting volume and flow rate of said solution in such a fashion that each segment of the sand formation being consolidated reacts with at least about 6.57 grams strontium hydroxide per liter of pore space in that segment; and
    c. maintaining thereafter a portion of said solution in contact with sand of the formation for a period of time as required for effective consolidation to occur.

* * * * *